July 5, 1927.
A. D. HUTTON
1,634,579
LIQUID DISPENSING DEVICE
Filed Nov. 12, 1925
2 Sheets-Sheet 1
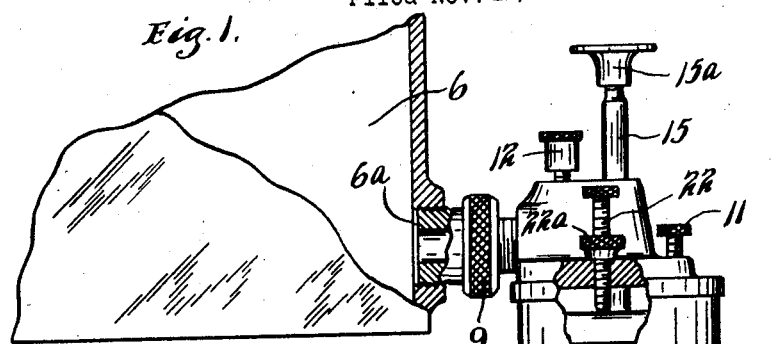
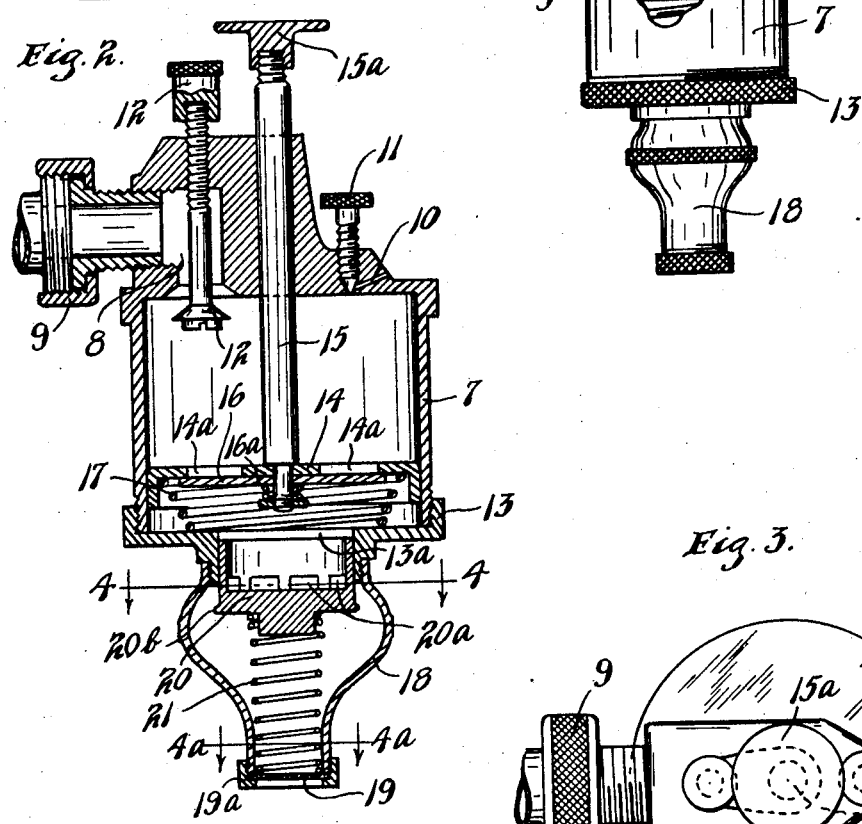
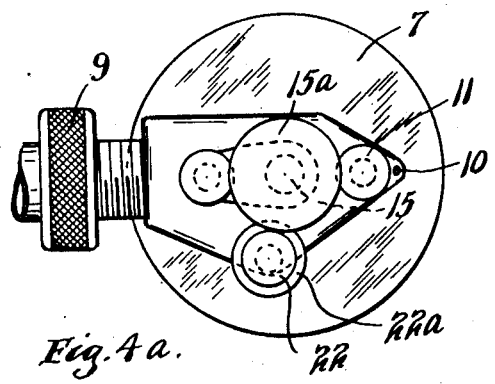
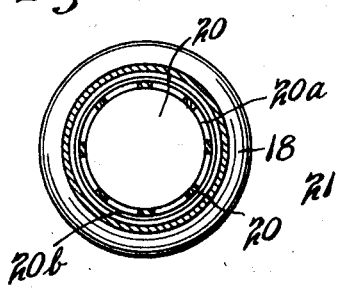
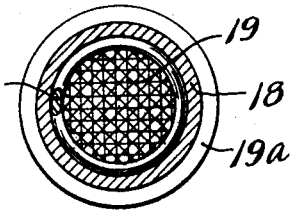
INVENTOR.
A. D. HUTTON.
BY HIS ATTORNEYS.

July 5, 1927.

A. D. HUTTON 1,634,579

LIQUID DISPENSING DEVICE

Filed Nov. 12, 1925    2 Sheets-Sheet 2

INVENTOR:
A. D. HUTTON.
BY HIS ATTORNEYS.

Patented July 5, 1927.

1,634,579

UNITED STATES PATENT OFFICE.

ALBERT D. HUTTON, OF MINNEAPOLIS, MINNESOTA.

LIQUID-DISPENSING DEVICE.

Application filed November 12, 1925. Serial No. 68,535.

This invention relates to devices for dispensing definite quantities of liquid from a liquid reservoir or other source of liquid supply. Devices of this nature are capable of wide general usage and adaptation, including dispensing means for cream and sirup in restaurants, dispensers for soda water fountains, oil stations, etc.

This invention has for its main object to provide a simple but highly efficient liquid dispenser adapted to dispense definite amounts of liquid by the manipulation of a piston in one direction and provided with positive means for preventing the subsequent dripping of liquid from the discharge outlet after a definite quantity has been dispensed.

It is a further object to provide such a device having a cylindrical casing with an outlet and intake and a piston working therebetween, the construction of the parts enabling the piston when moved towards the discharge end of the cylinder to not only discharge a definite amount of liquid but to simultaneously fill the cylinder for the next charge. In this connection, automatic means for returning the piston to operative position are provided whereby a definite amount of liquid may be dispensed by the movement of an operating handle in one direction only.

A more specific object of the invention is to provide in such a device a discharge sleeve valve normally held in closed position but projectible by the pressure of the liquid when the piston is moved in the direction of the discharge passage whereby a flow of liquid will be positively and quickly cut off the moment the piston has reached the limit of its discharge stroke. The sleeve valve is moreover provided with a flange adapted to engage the annular outer end of the discharge passage to further seal the valve.

A still further object of the invention is to provide simple but efficient means over the delivery nozzle of the discharge passage whereby, if a drop or two of the liquid should be discharged after said stroke of the piston, the same would be prevented from dropping.

These and other objects of the invention will be apparent from the following description made in connection with the accompanying drawings wherein like characters refer to similar parts throughout the several views; and in which, Fig. 1 is a side elevation of an embodiment of the invention applied to a tank or liquid reservoir, some parts being broken away and others shown in section;

Fig. 2 is a vertical section of the same;

Fig. 3 is a plan view of this embodiment;

Fig. 4 is a cross section taken on the line 4—4 of Fig. 2;

Figure 5:
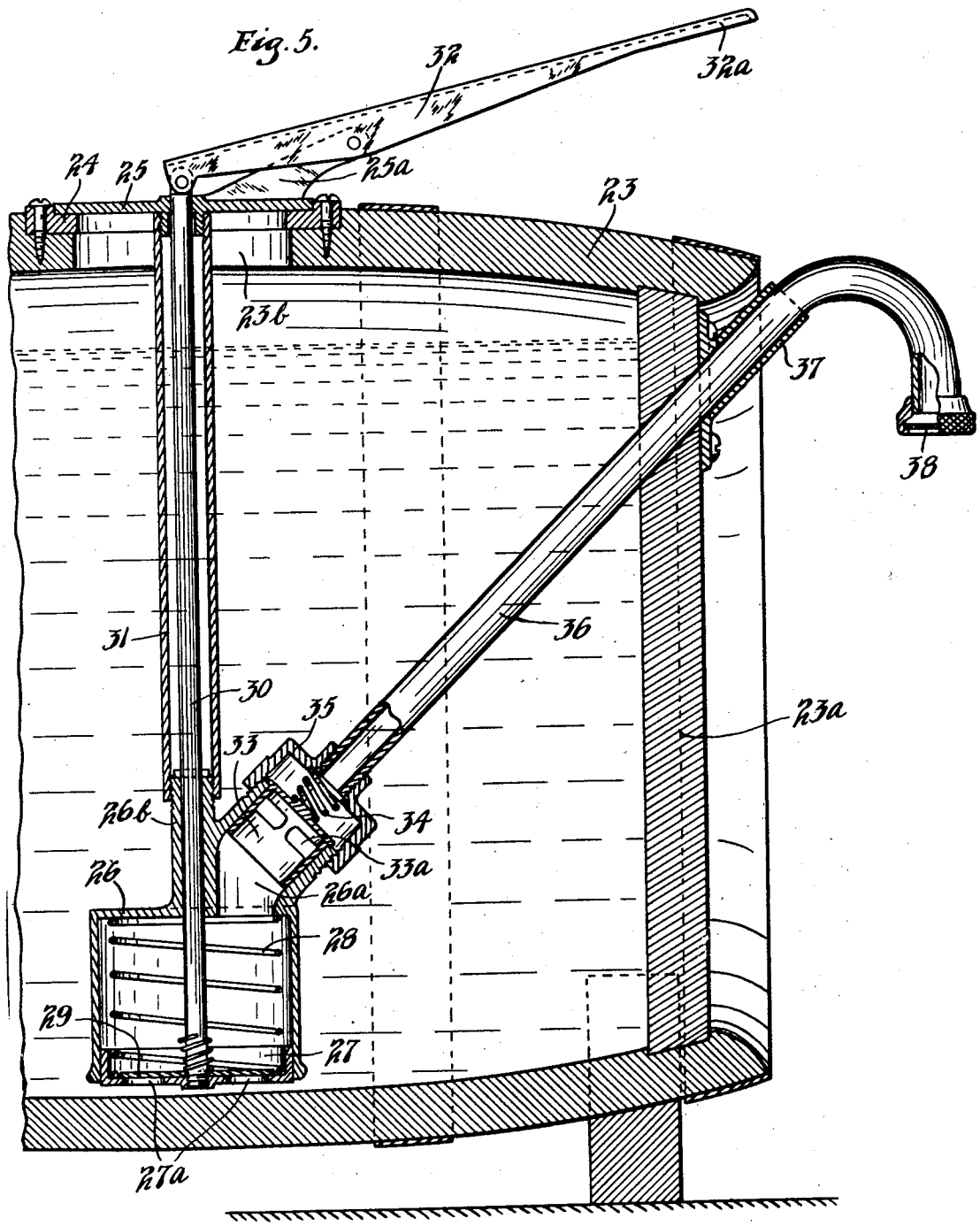

Fig. 4ª is a cross section taken on the line 4ª—4ª of Fig. 2; and

Fig. 5 is a vertical longitudinal section taken of a removable embodiment of the invention applied within a cask or barrel.

In the form of the invention illustrated in Figs. 1 to 4, the lower front portion of a tank or liquid reservoir is indicated by the numeral 6 having a threaded delivery passage 6ª to which the dispensing device is attached.

Applicant provides a substantially cylindrical casing 7 preferably in the form of a casting and provided at its upper end with the intake passage 8 adapted to be connected to reservoir 6 by means of a suitable union 9. A relatively small air intake passage 10 is provided through the top of casing 7, the supply of air therethrough being controlled by means of a needle valve 11. A valve 12 is also mounted in the top of casing 7 operative when turned to elevated position to close off the intake passage 8. A cap or plug 13 forms the bottom of the casing having threaded engagement with the lower annular flange thereof and provided with a centrally disposed and axially aligned outlet passage 13ª.

Within casing 7, piston 14 is slidably disposed controlled by means of the vertically disposed rod 15 slidably journalled in the top portion of casing 7 and passing therethrough to terminate in an operating handle 15ª. Piston 14 is provided with circumferentially spaced ports 14ª normally closed by means of the check valve 16 carried on the lower side thereof and resiliently held in closed position by means of coiled spring 16ª seated between the under side thereof and a small washer on the end of piston rod 15. Piston 14 is normally held in elevated position by means of a relatively large coiled spring 17 interposed between the under side of said piston and the upper side of the plug member 13.

A delivery nozzle 18 is threaded to the lower end of plug 13 having at its lower end two or more sheets of relatively fine screening 19 with the meshes thereof diagonally disposed to each other. An annular member 19ª holds said screening in operative position.

Within the outlet passage 13ª and delivery nozzle 18, a depressible sleeve valve 20 is disposed, snugly fitting intake passage 13ª and having its lower end closed and provided with an inclined flange 20ᵇ adapted to tightly engage the annular flange afforded by the lower end of the outlet passage 13ª. A plurality of radially disposed discharge ports 20ª above seat 20ᵇ are provided in the walls of sleeve valve 20 adapted to permit the discharge of liquid from casing 7 when valve 20 is projected to open position. A coiled spring 21 is interposed between the lower or outer end of sleeve valve 20 and screening 19 at the lower end of delivery nozzle 18.

To variably limit the stroke of piston 14 so that a desired amount of liquid may be dispensed, a stop member 22 is provided having threaded engagement with the top of casing 7 and extending therethrough, lock nut 22ª being also threaded thereon to contact the upper surface of the top of casing 7.

The operation of the device may be briefly summarized as follows:

Obviously, the piston 14 will normally be held in elevated position at the upper end of casing 7 with a charge of liquid below the piston, as shown in Fig. 1. To dispense a definite amount of liquid, the operating handle 15ª is depressed to the position shown in Fig. 2. The downward movement of the piston 14 forces the charge of liquid within casing 7 downwardly, the pressure of said liquid projecting sleeve valve 20 into discharging position against the tension of coiled spring 21 thereby causing a definite charge of liquid to be dispensed through delivery nozzle 18. As piston 14 is depressed towards the discharge opening as above described, a fresh charge of liquid is simultaneously drawn into casing 7 on the upper side of said piston, check valve 16 being obviously held in closed position during the stroke.

The moment pressure is relieved from the operating handle 15ª the piston 14 will be acted upon by spring 17 and will move upwardly causing a strong momentary suction below said piston. This momentary suction co-operates with spring 21 to suddenly retract and seal sleeve valve 20. The movement of sleeve valve 20 within the outlet passage is small and said sleeve valve will be closed and sealed before check valve 16 in the piston is fully opened. It will be seen that the radial ports 20ª in sleeve valve 20 are disposed some distance above the inclined seating surface 20ᵇ and will shut off the flow of liquid through the valve before the valve is sealed. The valve is tightly sealed when the annular seating surface 20ᵇ engages the peripheral end of outlet passage 13ª.

The valve 12 may be obviously closed to shut off the intake to casing 7 by screwing its handle to extreme upward position whereby the cap or plug 13 may be removed to permit access to casing 7 and for cleaning thereof. Likewise, the sleeve valve 20 may readily be removed for cleaning or repairing by unscrewing delivery nozzle 18 from its engagement with the lower end of plug 13. The amount of air admitted may be regulated by needle valve 11 and the stroke of piston 14 and the amount of liquid dispensed by each depression of the piston may be regulated by adjustable stop member 22, as above described.

The embodiment of the invention illustrated in Fig. 5 is very similar to the embodiment just described although the dispensing device is disposed in inverted position within the cask. The movement of the piston is reversed by providing an operating lever. This form of the invention is especially designed to be used in soda water fountains, confectionery stores, etc., where it is desirable to have dispensing means which may be readily installed in standard casks containing liquid and provided with the usual bung-hole or opening through the top thereof.

In Fig. 5 a standard type of cask 23 is illustrated having the end wall 23ª and the top opening or bung-hole 23ᵇ. An annular supporting member 24 is supported on the top of cask 23, about the hole 23ᵇ, from which the dispensing device is supported by means of the plug 25. In this embodiment of the invention a preferably cast cylindrical casing 26 is provided having an open bottom constituting the intake passage and provided at its top portion with the substantially cylindrical outlet passage 26ª terminating in an annular flange at its outer end. The piston 27 is disposed in casing 26 for sliding movement between the outlet and inlet passages, being normally held in extreme lower position by means of the coiled spring 28 situated between the under side of the top of casing 26 and the top of piston 27. Piston 27 is provided with a plurality of circumferentially spaced ports 27ª, the passage of liquid therethrough being controlled by the check valve 29 similar to the check valve 16 of the piston illustrated in Figs. 1 to 4, inclusive.

An elongated vertically extending piston rod 30 connected at its lower end to piston 27 is slidably journaled in a sleeve 26ᵇ formed in the top of casing 26 and passes through a tubular member 31 and through the disk 25 to the outer side of cask 23.

Sleeve 31 is threaded at one end to a depending portion of disk 25 and at the other end to the upper end of the sleeve 26ᵇ. This tubular member 31 therefore supports casing 26 and piston 27 from the plug or disk 25 supported by annular member 24 at the top of the cask. The outer or upper end of piston rod 30 is pivotally secured to the working end of a lever 32 fulcrumed on an upstanding lug 25ᵃ carried by the disk 25. The operating end 32ᵃ of the lever is disposed for convenient manipulation.

In the outlet passage 26ᵃ a sleeve valve 33 is disposed, similar in every way to the sleeve valve 20 illustrated in Figs. 1 to 4. This sleeve valve is spring pressed normally into closed position within passage 26ᵃ, the outer flange 33ᵃ thereof sealing the valve as in the form of the invention previously described. The spring 34 is interposed between valve 33 and the cap member 35 forming part of the discharge nozzle which is in the form of an elongated goose-neck 36 threaded at one end to cap 35 and extending through the end wall 23ᵃ of cask 23 to the outer side thereof. An obliquely extended sleeve 37 is secured to the outer side of wall 23ᵃ supporting said goose-neck 36. At the delivery end of member 36 screening 38 is provided similar to the screening 19 in the form of the invention first described.

The operation of this embodiment of the invention is essentially the same as the operation of the first form described with the exception, of course, that the movable parts of the dispensing device are actuated in the opposite direction from that of the parts in the first device. The piston and discharge valve, however, are actuated by depressing the operating handle 32ᵃ of lever 32, which moves the piston through its discharge stroke, opening the sleeve valve 33 and simultaneously drawing into the bottom of casing 26 the next charge to be dispensed. When the pressure on lever 32 is released the piston automatically is returned to normal position, passing through the liquid within casing 26, check valve 29 being opened by the pressure of the liquid as the piston is moved downwardly.

From the above description, it will be seen that the applicant has invented a simple but highly efficient device for dispensing amounts of liquid from the liquid reservoir or other source of liquid supply adapted to be quickly and easily operated and to positively control the delivery of liquid so that there will be no after dripping. The parts are few and simple and the entire device may be readily dissembled for cleaning without draining the tank or reservoir containing the liquid.

The device has been put to extensive actual usage and has been found highly successful for all the purposes intended.

It will, of course, be understood that various changes may be made in the form, details, proportions and arrangement of parts without departing from the scope of the invention.

What is claimed is:

1. A device for dispensing measured quantities of liquid comprising a casing having an intake passage and an outlet passage, a plunger, means yieldingly urging said plunger in one direction, check valve controlled means in said plunger permitting the liquid to flow through it when it moves in said direction, a longitudinally projectable sleeve valve in said outlet passage having a closed outer end and an annular seating surface adjacent thereto and having a plurality of radial ports disposed inwardly of said seating surface and adapted to be projected beyond the outer extremity of said outlet passage when said plunger is moved inwardly, and means for suddenly moving said sleeve valve inwardly as said plunger moves in said direction to firmly seat said annular surface.

2. A device for dispensing measured quantities of liquid, comprising a casing having an intake passage and an outlet passage, a plunger, means yieldingly urging said plunger in one direction, check valve controlled means in said plunger permitting the liquid to flow through it when it moves in said direction, a projectable sleeve valve in said outlet passage, said valve having seating surfaces adjacent its outer end, and an opening disposed inwardly of said seating surfaces and being arranged to be moved to its seat in said direction and to be firmly seated by the suction caused by the movement of said plunger, and means connected to said plunger to move it in the other direction and thereby open said sleeve valve.

3. A device for dispensing measured quantities of liquid comprising a casing having an intake passage and an outlet passage, a plunger, means yieldingly urging said plunger in one direction, check valve controlled means in said plunger permitting the liquid to flow through it when it moves in said direction, a sleeve valve in said outlet passage, said valve having inclined seating surfaces and being arranged to be moved to its seat in said direction and to be firmly seated by the suction caused by the movement of the plunger and means connected to said plunger to move it in the other direction and thereby open said sleeve valve.

4. A device for dispensing measured quantities of liquid, comprising a substantially cylindrical casing having an eccentrically alined intake passage adjacent the upper end, and a concentrically alined outlet passage adjacent the lower end, a plunger, means yieldingly urging said plunger toward the top of said casing, check valve controlled means, in said plunger, permitting the liquid to flow therethrough when said plunger moves upwardly and a projectable valve in said outlet passage, means connected to said plunger to move it downwardly and thereby open said last mentioned valve, and a valve concentrically alined with said intake passage and having threaded engagement with the top of said casing adapted to seat against the lower end of said intake passage to shut off the flow of liquid into said casing.

In testimony whereof I affix my signature.

ALBERT D. HUTTON.